United States Patent
Macken et al.

(10) Patent No.: US 9,396,745 B2
(45) Date of Patent: Jul. 19, 2016

(54) MULTI-SENSOR READER WITH DIFFERENT READBACK SENSITIVITIES

(71) Applicant: Seagate Technology LLC, Cupertino, CA (US)

(72) Inventors: Declan Macken, Eden Prairie, MN (US); Jason Gadbois, Shakopee, MN (US); Eric W. Singleton, Maple Plain, MN (US); John M. Wolf, Maple Grove, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/201,358

(22) Filed: Mar. 7, 2014

(65) Prior Publication Data

US 2015/0255092 A1    Sep. 10, 2015

(51) Int. Cl.
   *G11B 5/39* (2006.01)

(52) U.S. Cl.
   CPC ............ *G11B 5/3951* (2013.01); *G11B 5/3909* (2013.01); *G11B 5/3912* (2013.01); *G11B 5/3932* (2013.01); *G11B 5/3948* (2013.01); *G11B 5/3958* (2013.01); *G11B 2005/3996* (2013.01)

(58) Field of Classification Search
   CPC .. G11B 5/3909; G11B 5/3912; G11B 5/3945; G11B 5/3948; G11B 5/3951; G11B 5/3954; G11B 5/3958; G11B 5/3961; G11B 5/3964; G11B 5/3932
   USPC .................. 360/314, 316, 319, 324.12, 324.2
   See application file for complete search history.

(56) References Cited

U.S. PATENT DOCUMENTS

| | | | |
|---|---|---|---|
| 4,523,243 A | 6/1985 | Billington | |
| 6,104,562 A | 8/2000 | Ottesen et al. | |
| 6,154,335 A | 11/2000 | Smith et al. | |
| 6,288,856 B1 | 9/2001 | Ottesen et al. | |
| 6,750,068 B2 | 6/2004 | Chen | |
| 6,807,034 B2 | 10/2004 | Hasegawa et al. | |
| 6,826,140 B2 | 11/2004 | Brommer et al. | |
| 6,829,119 B2 | 12/2004 | Bonin et al. | |
| 6,897,532 B1 | 5/2005 | Schwarz et al. | |
| 7,012,786 B2 | 3/2006 | Nakamikawa | |
| 7,126,890 B2 | 10/2006 | Learned et al. | |
| 7,502,194 B2 | 3/2009 | Alexander et al. | |
| 7,567,397 B2 | 7/2009 | Lu | |
| 7,636,219 B2 | 12/2009 | Ikegami et al. | |
| 7,719,802 B2 | 5/2010 | Kautzky et al. | |
| 7,813,066 B2 | 10/2010 | Nakagawa et al. | |
| 7,891,080 B2 | 2/2011 | Alexander et al. | |
| 8,243,398 B2 * | 8/2012 | Partee ................ | G11B 5/00878 360/314 |
| 8,446,698 B2 | 5/2013 | Fuji et al. | |
| 8,558,331 B2 | 10/2013 | Zhu et al. | |
| 8,619,394 B1 | 12/2013 | Park et al. | |
| 8,786,987 B2 * | 7/2014 | Edelman et al. ......... | 360/324.12 |
| 8,873,204 B1 * | 10/2014 | Gao et al. ...................... | 360/319 |
| 8,908,333 B1 * | 12/2014 | Rudy et al. ................... | 360/319 |
| 9,042,058 B1 * | 5/2015 | Li .......................... | G11B 5/3912 360/316 |
| 2003/0123198 A1 * | 7/2003 | Sugawara et al. ............. | 360/314 |

(Continued)

*Primary Examiner* — Jefferson Evans
(74) *Attorney, Agent, or Firm* — Hall Estill Attorneys at Law

(57) ABSTRACT

Apparatus for sensing data from a magnetic recording medium using a multi-sensor reader with different readback sensitivities. In accordance with some embodiments, a data transducing head has first and second read sensors. The first read sensor is optimized for reading data and the second read sensor is optimized to detect thermal asperity (TA) events.

23 Claims, 5 Drawing Sheets

(56) References Cited

U.S. PATENT DOCUMENTS

| | | |
|---|---|---|
| 2004/0085683 A1 | 5/2004 | Lin et al. |
| 2005/0036437 A1 | 2/2005 | Learned et al. |
| 2005/0068684 A1* | 3/2005 | Gill .............................. 360/314 |
| 2006/0245110 A1 | 11/2006 | Hanchi et al. |
| 2007/0019355 A1 | 1/2007 | Ito |
| 2008/0144228 A1 | 6/2008 | Funayama |
| 2009/0316309 A1 | 12/2009 | Partee et al. |
| 2010/0149676 A1 | 6/2010 | Khizorev et al. |
| 2011/0007416 A1 | 1/2011 | Kuramoto |
| 2011/0069413 A1 | 3/2011 | Maat et al. |
| 2011/0102933 A1 | 5/2011 | Kurita et al. |
| 2011/0134572 A1* | 6/2011 | Qiu et al. ....................... 360/313 |
| 2012/0120522 A1* | 5/2012 | Johnson et al. ................. 360/75 |
| 2012/0120720 A1 | 5/2012 | Cambou |
| 2013/0077189 A1* | 3/2013 | Kato et al. ....................... 360/75 |
| 2013/0082339 A1 | 4/2013 | Aggarwal et al. |
| 2014/0063644 A1* | 3/2014 | Lou et al. ......................... 360/75 |
| 2015/0062735 A1* | 3/2015 | Sapozhnikov ......... G11B 5/115 360/46 |

* cited by examiner

MULTI-SENSOR READER WITH DIFFERENT READBACK SENSITIVITIES

SUMMARY

Various embodiments of the present disclosure are generally directed to an apparatus for sensing data from a magnetic recording medium using a multi-sensor reader with different readback sensitivities.

In some embodiments, a data transducing head has first and second read sensors. The first read sensor is optimized for reading data and the second read sensor is optimized to detect thermal asperity (TA) events.

In further embodiments, an apparatus has first and second read sensors adapted to sense magnetic patterns on an adjacent recording surface. The first read sensor has a non-magnetic barrier layer contactingly disposed between opposing magnetic layers and formed of a first material to provide an optimized reader response. The second read sensor has a non-magnetic barrier layer contactingly disposed between opposing magnetic layers and formed of a different second material to provide a finite thermal coefficient of resistance (TCR) response.

In further embodiments, a two dimensional magnetic recording (TDMR) system includes a first read sensor having a first signal to noise ratio (SNR) response and a relatively lower sensitivity to thermal asperity (TA) events. The TDMR system further has a second read sensor connected to the first read sensor having a second SNR response lower than the first SNR response and a relatively higher sensitivity to TA events. The first read sensor is optimized for data recovery capabilities on an adjacent track, and the second read sensor is configured for degraded data recovery capabilities on an adjacent track and for detection of TA events.

DETAILED DESCRIPTION

Figure 1:
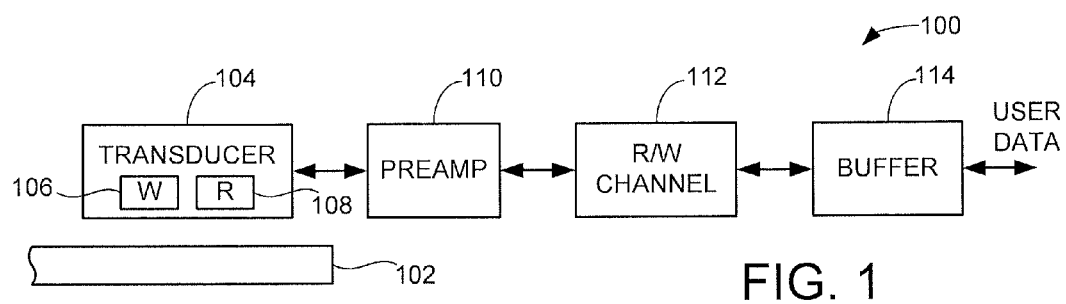
FIG. 1 is a functional block diagram of a data storage device constructed and operated in accordance with various embodiments.

Data storage devices store and retrieve data in a fast and efficient manner. Some data storage devices such as hard disc drives (HDDs) store data in the form of tracks on one or more rotatable data storage media. Data read/write transducers (heads) are supported adjacent recording surfaces of the media by fluidic currents established by high speed rotation of the surfaces. A write element in the transducer writes data to the tracks, and a read sensor (read element or reader) in the transducer can be subsequently positioned adjacent the tracks to read back the previously stored data.

A continuing trend in the data storage industry is to provide storage devices with ever higher data storage capacities and data densities. Some recent product designs have proposed the use of multiple read sensors (readers) in a transducer reader section. The use of multiple sensors allows the concurrent recovery of data from multiple adjacent data tracks using two dimensional magnetic recording (TDMR). Multiple sensors can also be used to generate separate readback signals from the same data track during so-called multi-sensor reading (MSR) operations.

Various embodiments of the present disclosure are generally directed to improvements in the manner in which sensors are used in a multi-sensor data recording environment. As explained below, a transducing head has at least first and second magnetic readers (read sensors) with different readback characteristics. In at least some embodiments, the readers are electrically connected in series between opposing top and bottom shield structures, and an intermediate shield structure is connected between the first and second readers.

The first and second readers have different signal to noise ratio (SNR) responses and different sensitivities to various anomalous effects, such as thermal asperities. The first reader is characterized as an optimized reader for data recovery with a relatively low thermal coefficient of resistance (TCR), and the second reader is characterized as a degraded reader with a relatively higher (so called "finite") TCR.

The first reader is configured to be largely immune to anomalous effects whereas the second reader is more susceptible to such effects. Both readers can be configured to recover data from data tracks on the adjacent medium during TDMR or MSR operations. Alternatively, the optimized reader can be used as a primary data recovery sensor and the second reader can be used as an anomalous event detector (e.g., thermal asperity detector, fly height detector, etc.) instead of being used to transduce data. The readers can be configured to switch between these different modes at appropriate times.

The first and second readers are provided with different constructions to provide the different readback sensitivities. In some embodiments, each of the first and second readers has a tunnel barrier layer. The tunnel barrier layer of the first reader is formed of a first material such as magnesium oxide (MgO), and the tunnel barrier layer of the second reader is formed of a different, second material such as titanium (Ti) or titanium oxide (TiO). Other respective materials and constructions can be used. Both tunnel barrier layers may be non-magnetic.

In some cases, the first and second readers each has a giant magnetoresistive (GMR) construction with the tunnel barrier layer in each sensor being placed between a magnetic free layer and a magnetic reference layer. Both readers may have a common type of construction, such as both readers taking a tri-layer or spin valve construction. In other embodiments, one reader has a first type of construction (e.g., tri-layer) and one reader has a second type of construction (e.g., spin valve). Any number of magnetic transducing constructions can be used as desired.

Attention is now directed to FIG. 1 which provides aspects of an exemplary data storage device 100 in accordance with some embodiments. The device 100 includes a rotatable data recording medium (disc) 102 and a data transducer 104. The transducer 104 is radially advanced across the medium 102 to access data tracks defined on a recording surface of the medium. The transducer 104 includes a writer section (W) 106 to write data to the medium and a reader section (R) 108 to read back data from the medium.

FIG. 1 further shows the device 100 to include a preamplifier/driver (preamp) circuit 110, a read/write (R/W) channel 112 and a buffer memory 114. During a write operation, write data supplied by a host are temporarily stored in the buffer 114, conditioned by the R/W channel 112 and streamed to the preamp 110 which applies time-varying write currents to the writer section 106. The writer section includes one or more write elements that selectively magnetize the associated tracks to write the data thereto.

During a subsequent read operation, the reader section 108 recovers one or more readback signals from the medium 102. The preamp 110 preamplifies the readback signals, and the R/W channel applies signal processing and decoding techniques to recover the originally stored data which are temporarily stored in the buffer 114 pending transfer to the host.

Figure 2:
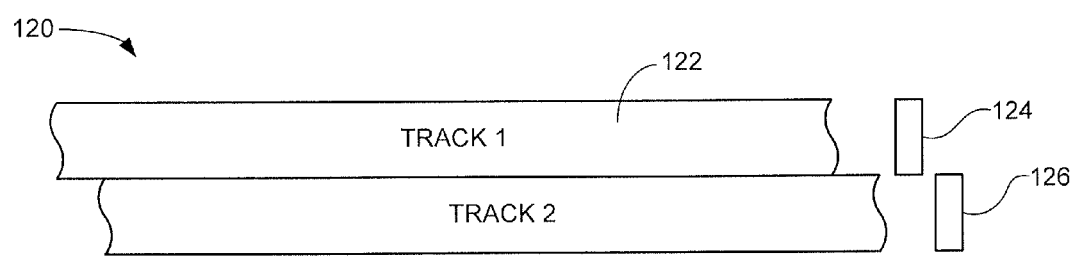
FIG. 2 depicts two dimensional (2D) recording and recovery using the device of FIG. 1 in some embodiments.

FIG. 2 illustrates portions of a rotatable storage medium 120 suitable for use in the device 100 of FIG. 1. The storage medium 120 has a recording surface on which a number of tracks 122 are formed. Two such tracks are identified as Track 1 and Track 2. Associated read sensors (readers) 124, 126 are provided within a reader section to concurrently read data stored to the respective tracks 122. In a two dimensional magnetic recording (TDMR) environment, the data from the respective tracks are concurrently transduced by the readers 124, 126 to provide a pair of readback signals that are processed by a read channel (e.g., 112, FIG. 1) to recover the data stored to the tracks 122. It will be noted that the respective read sensors 124, 126 are non-overlapping in a cross-track direction (e.g., in the width direction across the tracks), but such is merely exemplary and is not limiting.

Figure 3:
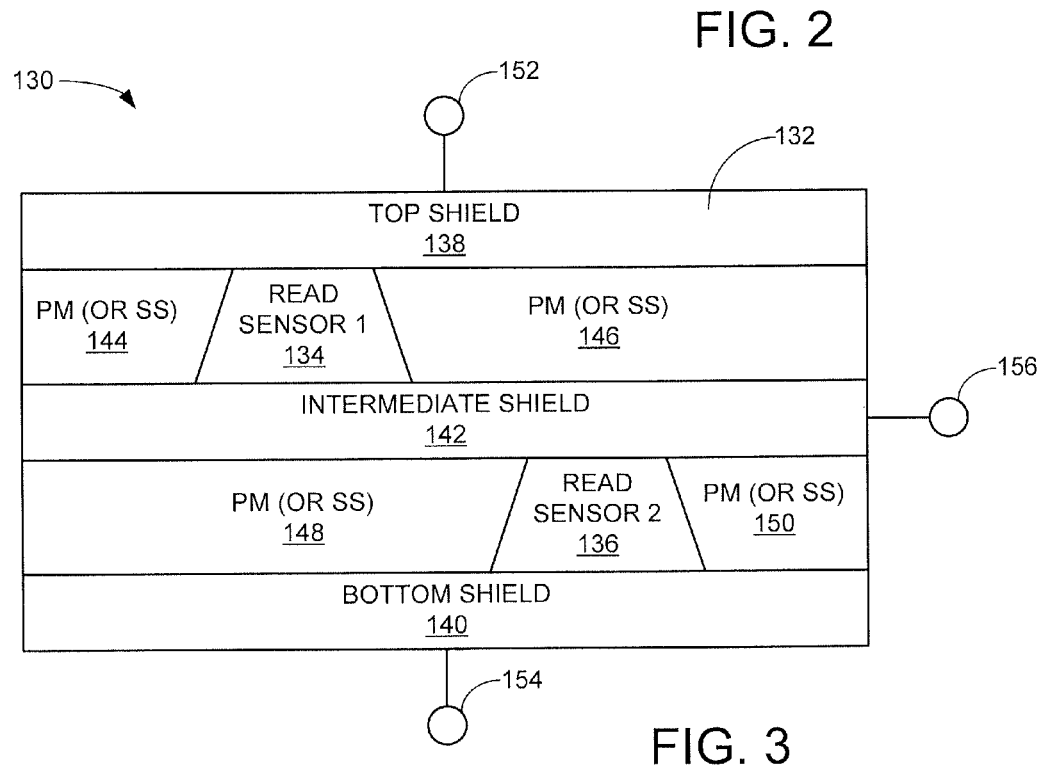
FIG. 3 is a schematic depiction of the transducer of FIG. 1 in accordance with some embodiments.

FIG. 3 is a schematic representation of a transducer 130 similar to the transducers discussed in FIGS. 1-2. The view in FIG. 3 represents an air bearing surface (ABS) view in facing relation to an associated recording surface. Other constructions are contemplated so that the arrangement of FIG. 3 is merely exemplary and not limiting.

A reader section 132 of the transducer 130 includes first and second read sensors (readers) 134, 136 connected between top and bottom shields 138, 140 and separated by one or more intermediate shields 142. The first reader 134 (Read Sensor 1) is characterized as an optimized reader with a relatively low thermal coefficient of resistance (TCR), and the second reader 136 (Read Sensor 2) is characterized as a finite reader with a relatively higher TCR.

Permanent magnets (PM) and/or side shields (SS) 144, 146, 148 and 150 are provided on opposing sides of the first and second readers 134, 136 as shown.

Bond pads 152, 154 and 156 provide electrical connections to accommodate bias current inputs and readback signal outputs. During a read operation, a relatively small read bias current is passed through the stack from pad 152 to 154 so as to successively pass through the respective sensors 134, 136. Changes in magnetization of the adjacent recording surface induce changes in electrical resistance of the respective sensors, allowing pulses to be generated in readback signals that generally correspond to the magnetization pattern of the recording surfaces. The readback signals from the first reader 134 can be accessed across pads 152, 156, and readback signals from the second reader 136 can be accessed across pads 154, 156.

In other embodiments, split shields and fully isolated electrical circuits for both readers can be used. For example, with reference again to FIG. 3 the intermediate shield 142 can be divided into two separate shields separated by a suitable insulating material layer, and each can have its own bond pad connections so that separate currents are passed through the read sensors 134, 136. Other interconnections can be used as desired.

Figure 4A:
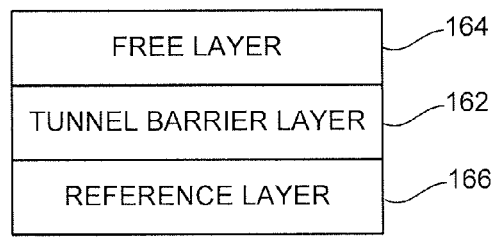
FIGS. 4A-4B show different exemplary constructions for the sensors in FIG. 3.

The respective read sensors 134, 136 can take a variety of forms. FIG. 4A shows aspects of a giant magnetoresistive (GMR) structure 160 in which a non-magnetic tunnel barrier layer 162 is provided between at least one magnetic free layer 164 and at least one magnetic reference layer 166. The free layer has a variable magnetic orientation and the reference layer has a generally fixed magnetic orientation. The magnetization of the free layer relative to the reference layer can be made to vary in relation to the magnetization of the adjacent recording track, and these changes in magnetization of the free layer induce changes in the electrical resistance of the stack.

While only three layers are shown in FIG. 4A, additional layers can be incorporated into the GMR structure 160 including one or more antiferromagnetic (AFM) layers, permanent magnet (PM) layers, synthetic ferromagnetic (SFM) layers, coupling layers, decoupling layers, seed layers, cap layers, electrode layers, shield layers, etc.

In some embodiments, both of the sensors 134, 136 from FIG. 3 are GMR readers as depicted in FIG. 4A with similar constructions for the free and reference layers 164, 166 and different constructions for the tunnel barrier layers 162. In one example, the tunnel barrier layer 162 of the first reader 134 is formed of magnesium oxide (MgO) and the tunnel barrier layer 162 of the second reader 136 is formed of titanium (Ti) or titanium oxide (TiO). Other respective materials can be used.

The first reader 134 is optimized for data recovery and event suppression. The second reader 136 is provided with a finite thermal coefficient of resistance (TCR) which provides degraded data recovery characteristics and increased susceptibility to anomalous events. Such anomalous events may be sensed through localized heating of the sensor responsive to contact with a recording surface (e.g., disc-head contact), or a thermal asperity (localized change in distance between the head and the recording surface). Other anomalous events may arise from areas of disturbed lubricant (e.g., worn areas), mechanical shock events, contamination, etc.

A thermal asperity (TA) may arise from a localized grown defect having a higher elevation than the surrounding recording surface, or a localized depression having a lower elevation than the surrounding recording surface. TA events may be contact-based where physical contact occurs between the head and the disc, or non-contact based where no contact occurs but a significant localized difference in fly height is experienced.

It has been found by the inventors that GMR structures 160 that utilize certain materials for the tunnel barrier layer 162 such as MgO can be largely immune from TA events and other types of anomalous events while providing a significantly high SNR response. At the same time, GMR structures that utilize other materials for the tunnel barrier layer 162 such as Ti or TiO tend to provide a finite TCR, a degraded SNR and increased sensitivity to TA events and other types of anomalous events.

Using a finite TCR response sensor construction as one of the two (or more) read sensors as disclosed herein eliminates the need for a separate anomalous event detector, potentially reduces the number of required bond pads, and allows the finite TCR sensor to support TMDR recording. These and other considerations are discussed in greater detail below.

Figure 4B:
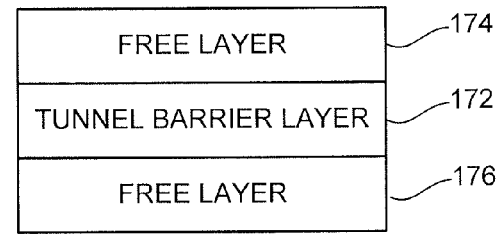

FIG. 4B shows aspects of an alternative tri-layer structure 170 for the respective first and second readers 134, 136 of FIG. 3. The tri-layer structure 170 includes a non-magnetic tunnel barrier layer 172 between respective magnetic free layers 174, 176. Magnetic biasing structures adjacent the ABS and/or distal the ABS can be used to establish a desired based magnetization of the free layers 174, 176. As before, the first reader 134 can utilize a tri-layer construction with an MgO tunnel barrier layer 172 and the second reader 136 can utilize a tri-layer construction with a Ti or TiO tunnel barrier layer 172. Other respective materials can be used, and additional layers can be incorporated as desired.

The tri-layer structure 170 incorporates two free layers rather than one free layer and one reference layer as in FIG. 4A. Separate biasing structures (not shown) can be used to urge the free layers to a generally steady state anisotropic orientation. As before, the respective orientations of the free layers 174, 176 are altered responsive to the magnetization pattern of an adjacent track, and this in turn alters the overall electrical resistance of the stack which can be sensed via pulses in the readback signal.

In another embodiment, a selected one of the readers 134, 136 from FIG. 3 takes the construction shown in FIG. 4A, and the remaining one of the readers 134, 136 takes the construction shown in FIG. 4B.

Figure 5:
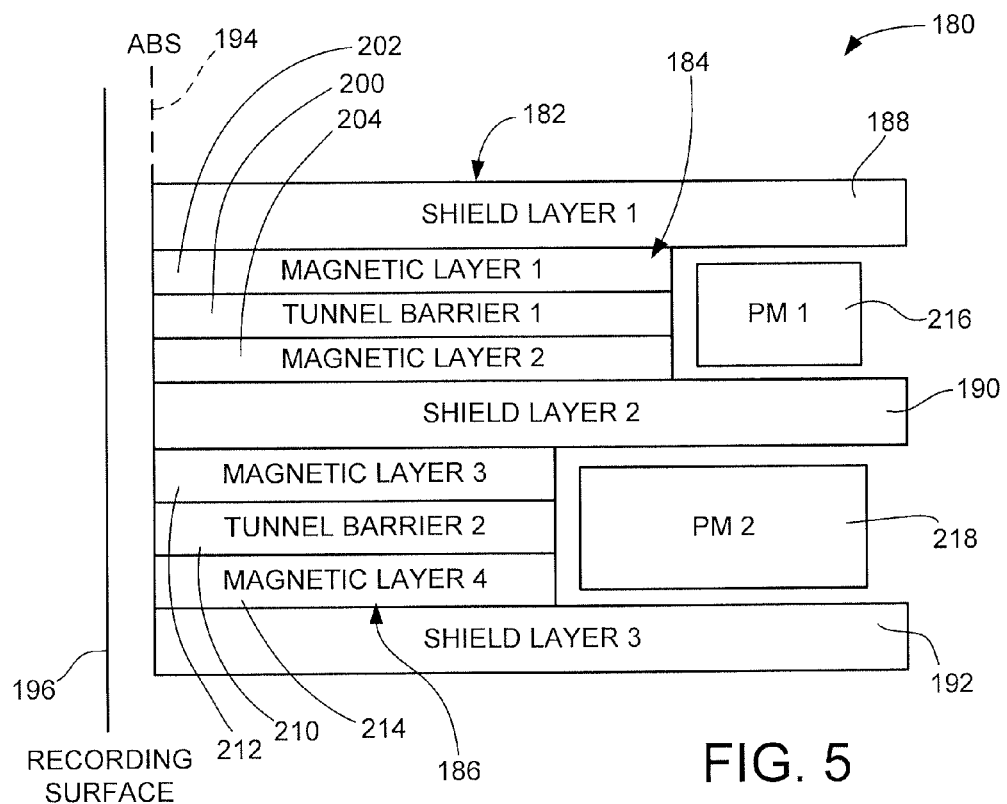
FIG. 5 is a side view of the transducer of FIG. 1 in other embodiments.

FIG. 5 is a side view of a transducer head 180 in accordance with further embodiments. A reader section 182 includes first and second readers 184, 186 interposed between first, second and third shield layers 188, 190, 192. The stack is aligned along an air bearing surface (ABS) 194 in facing relation to a recording surface 196.

The first reader 184 includes a first tunnel barrier layer 200 between first and second magnetic layers 202, 204. The second reader 186 includes a second tunnel barrier layer 210 between third and fourth magnetic layers 212, 214. Additional layers including cap layers, seed layers, lamination layers, pinning layers, additional shield layers, etc. may be incorporated as required. First and second permanent magnets (PM 1 and PM 2) are represented at 216, 218. Other configurations are readily contemplated including different configurations for the shields, etc.

It will be noted that the first reader 184 has a greater stripe height (e.g., distance from ABS 194 to distal edge adjacent PM 1) than the stripe height of the second reader 186, and the relative thicknesses of the layers in the first reader 184 are smaller than the thicknesses of the layers of the second reader 186. Any number of differences in construction can be applied to obtain the desired readback responses of the respective read sensors 184, 186.

Figure 6:
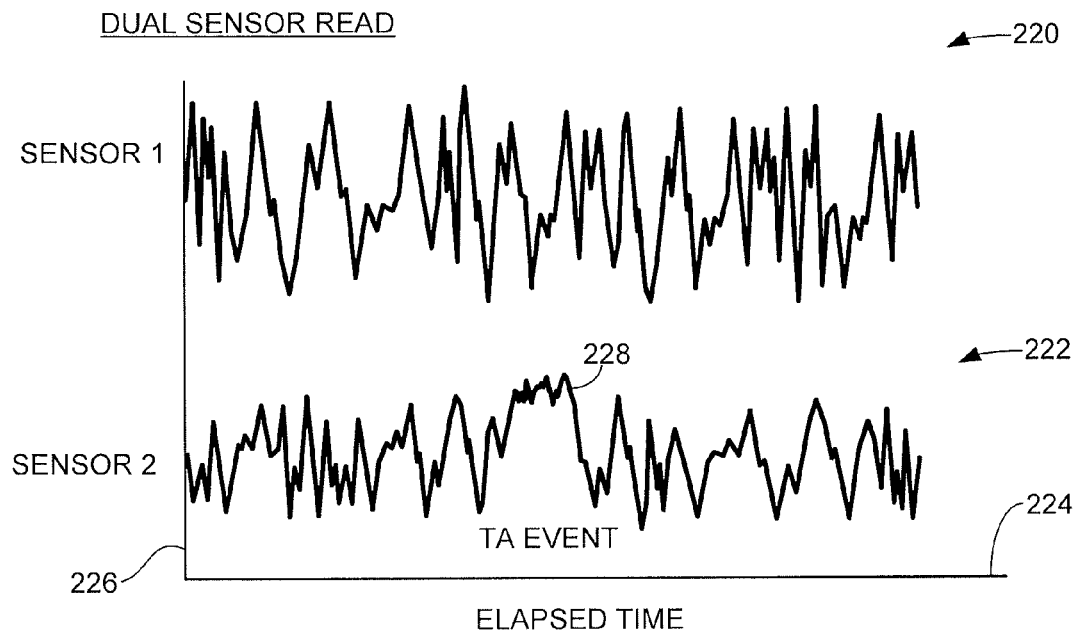
FIG. 6 shows dual sensor read operation of the transducer of FIG. 3.

FIG. 6 graphically represents readback signals 220, 222 obtained from the first and second read sensors 184, 186 of FIG. 5 during TDMR (two dimensional magnetic recording) readback operations. The signals 220, 222 are plotted against a common elapsed time x-axis 224 and a common amplitude y-axis 226. The two read sensors (Sensor 1 and Sensor 2) may be configured to transduce data from adjacent tracks such as depicted in FIG. 2.

It can be seen that both sensors provide data recovery, although optimized Sensor 1 provides a greater SNR response than the degraded Sensor 2, as evidenced from the relative change in raw signal amplitude values. The actual increase in SNR provided by the first sensor as compared to the second sensor will vary depending on the requirements of a given application, but in some cases the first sensor may have an SNR response that is upwards of about 10 dB or higher as compared to the SNR response of the finite response second sensor.

It is contemplated that a thermal asperity (TA) event is encountered by both sensors during the read operation represented in FIG. 6, as noted at region 228. The TA event is detected by the second sensor but not the first sensor, as can be seen by a comparison of readback signal 222 to readback signal 220. Post processing can use the detected TA event to initiate appropriate corrective action, such as by marking the location of the detected TA event, deallocating that portion of the recording surface from future use, performing a free retry, etc.

It is contemplated that the encoded data written to the recording surface will have sufficient error detection and correction (EDC) encoding to permit recovery of the data portion from signal 222 proximate the TA event. In some cases, the data written to tracks accessed by the finite response sensor (Sensor 2) will be encoded with additional EDC capability to account for the differences in readback response characteristics of the respective sensors.

More generally, different data tracks may have different encoding structures to account for the differences between the first and second sensors, with a first set of tracks normally recovered using the first sensor and a second set of tracks normally recovered using the second sensor. In other cases, all of the tracks are nominally encoded using the same encoding scheme and are susceptible to being read by either sensor. In this latter example, if attempts to read a track using the degraded second sensor are unsuccessful, the track can be subsequently reread using the optimized first sensor.

Figure 7:
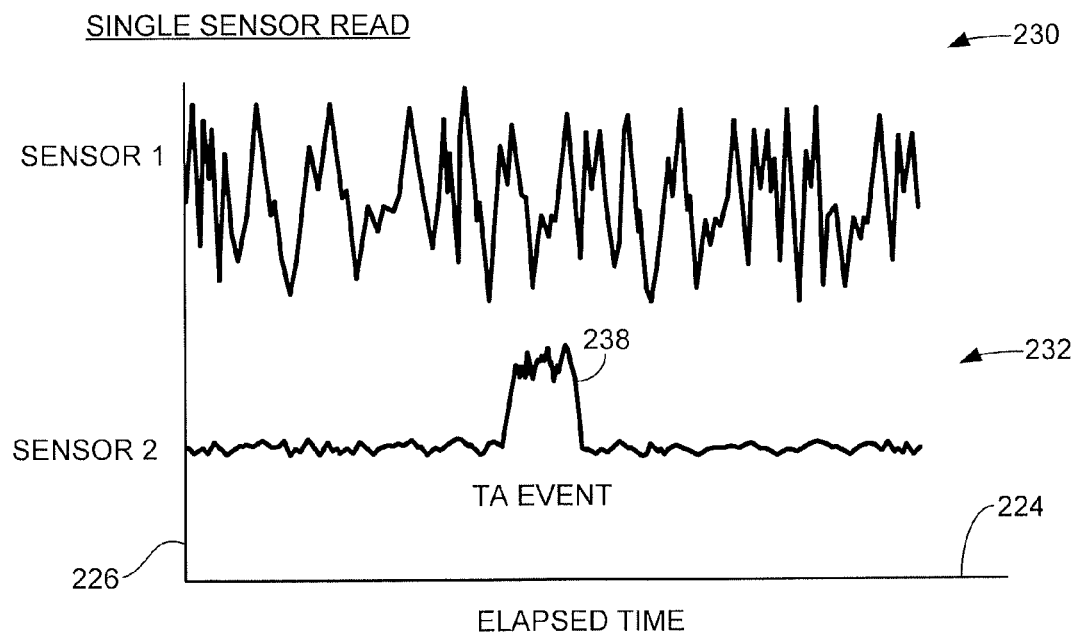
FIG. 7 shows single sensor read operation of the transducer of FIG. 3.

FIG. 7 shows operation of the respective read sensors 184, 186 from FIG. 5 during a single sensor read operation wherein the first sensor (Sensor 1) is used primarily for data decoding and the second sensor (Sensor 2) is used primarily for event detection. Readback signals 230, 232 represent the readback response from the respective sensors. The signals 230, 232 are plotted against the same x, y axes from FIG. 6.

A thermal asperity (TA) event is denoted at 238 in the readback signal 232 from Sensor 2. As before, the system can operate to take corrective actions as a result of the detected event. As noted above, Sensor 2 can be used to detect a variety of anomalous events including fly height, head-disc contact events, mechanical shock events, etc.

While the dual sensor read mode of FIG. 6 represents two dimensional magnetic recording (TDMR) so that the read signals 220, 222 are obtained from separate tracks, multi-sensor reading (MSR) can alternatively be employed so that both sensors recover data from the same track. The same read sensors can be configured to switch between the respective modes of FIGS. 6 and 7 at different times, such as at different radial locations in the medium, in response to a detected error condition, etc.

FIGS. 8A-8D illustrate a number of additional example multi-sensor configurations in accordance with various embodiments. The relative sizes and aspect ratios of the elements shown in these figures are merely representative and are not necessarily drawn to scale.

Figure 8A:
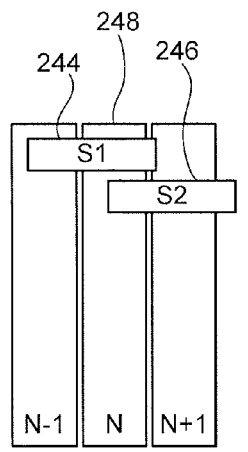
FIGS. 8A-8D are various combinations of multi-sensor arrangements in accordance with further embodiments.

FIG. 8A depicts a two sensor arrangement with read sensors 244 and 246 (S1 and S2) which span three adjacent tracks 248. The tracks are arbitrarily denoted as Tracks N, N−1 and N+1 where N is an integer. The read sensors 244, 246 are placed in an overlapping arrangement with respect to the cross-track (e.g., track width) direction. While not limiting, it is contemplated that the Sensors S1-S2 are configured to sense data from a single selected track, in this case Track N, with Sensor S1 constituting the optimized reader (e.g., first reader 184 in FIG. 5) and Sensor S2 constituting the finite TCR reader (e.g., second reader 186 in FIG. 5).

The use of multiple sensors improves the ability of the device to recover data from the tracks in view of track misregistration (TMR) and other effects that tend to cause misalignment between the sensors and the tracks. From the relative dimensions of the sensors and the tracks, it can be seen that a significant amount of TMR (e.g., side-to-side displacement of the sensors) can be accommodated while still recovering the data from a target track. In some cases, readback signals may be obtained from both sensors and suitable signal processing applied thereto to decode the bit pattern of Track N.

Figure 8B:
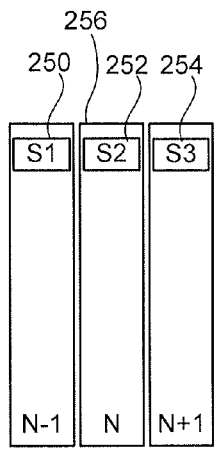

FIG. 8B depicts a three sensor arrangement with non-overlapping read sensors 250, 252 and 254 (S1-S3) nominally aligned with three adjacent tracks 256 (Tracks N−1, N and N+1). In FIG. 8B, the sensors can take any combination of optimized and finite TCR constructions. For example and not by limitation, the outer Sensors S1 and S3 can be optimized readers and intermediate sensor S2 can have a finite TCR. Alternatively, the intermediate sensor S2 can be an optimized reader and the outer Sensors S1 and S3 can have finite TCR. Other combinations are envisioned.

Depending on the alignment of the optimized reader(s), one or more of the Tracks N−1, N and/or N+1 can be read by the reader section while accommodating a significant amount of TMR.

Figure 8C:
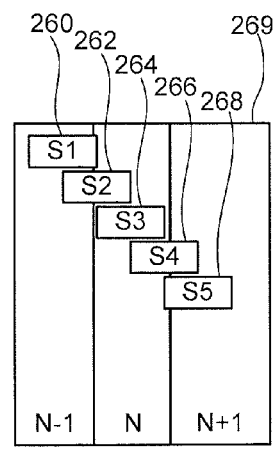

FIG. 8C shows another arrangement with overlapping Sensors 260, 262, 264, 266 and 268 (Sensors S1-S5) adjacent Tracks N−1, N and N+1 (269). The tracks 269 are overlapping (shingled) tracks so that each subsequently written track overlaps a portion of an immediately previously written track. This is merely for purposes of illustration and is not limiting. Shingled tracks can be applied to FIGS. 8A and 8B, and non-shingled tracks can similarly be used in FIG. 8C. As before, the sensors S1-S5 are overlapping and arranged to detect data from one or more of the tracks, and can be any suitable combination of optimized and finite TCR readers.

Figure 8D:
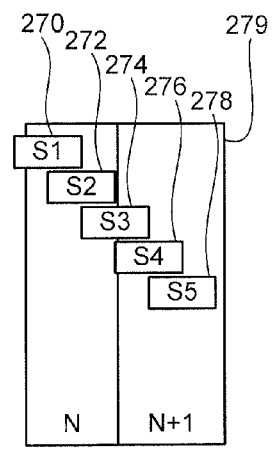

FIG. 8D is yet another arrangement of overlapping sensors 270, 272, 274, 276 and 278 (S1-S5) adjacent a pair of tracks 279 (Tracks N and N+1). The tracks are shown to be shingled, but this is merely exemplary as before. In FIG. 8D, TDMR recording is used so that data are concurrently recovered from both tracks N and N+1. In this case, nominally Sensors S1 and S2 are used to recover data from track N, Sensors S4 and S5 are used to recover data from track N+1, and intermediate Sensor S3 can be used to recover data from either track. In some cases, S3 can be the finite TCR sensor and Sensors S1-S2 and S4-S5 can be optimized sensors. Other relative numbers and arrangements of sensors and tracks can be used. Generally, X sensors may collectively span Y tracks, where X and Y are both plural numbers which may or may not be equal (e.g., X>Y, X=Y or X<Y).

Different operations can be carried out by the multi-sensor arrangements of the present disclosure. A "select best sensor" operation can be carried out where multiple sensors decode data from a common track. A "position correction" operation can be carried out in addition to, or in lieu of, the select best sensor operation whereby the relative outputs of the respective read sensors provide servo control information to a servo control circuit to effect changes in radial position of the reader section relative to the tracks. Relative changes in SNR values can be used to indicate an offtrack condition.

A "combined sensor signals" operation can be carried out in lieu of, or in addition to, the position correction operation, where components of each of the output signals from multiple sensors are combined to provide a composite signal that is used to recover data from one or more tracks. The combined signal may switch between different sensor outputs or may consolidate multiple components from multiple signals. The signal processing algorithms can take into account the different nominal SNR responses of the respective sensors.

Figure 9:
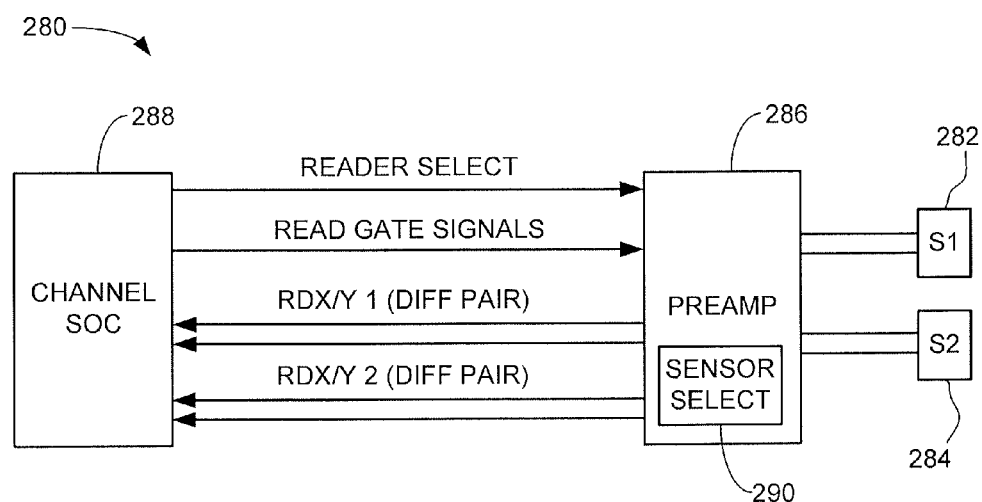
FIG. 9 is a simplified block diagram showing signals that may be passed between the SOC, the preamp and the sensors as required.

FIG. 9 is a functional block representation of a readback circuit 280 in accordance with some embodiments. The readback circuit 280 includes first and second read sensors 282, 284 (Sensors S1 and S2). As before, Sensor S1 is an optimized sensor and Sensor S2 is a finite TCR sensor. The respective sensors 282, 284 provide differential readback signals to a preamp 286. These readback signals may take the form discussed above in FIGS. 6-7.

A channel system on chip (SOC) device 288 provides write and read processing. During a read operation, the SOC device 288 outputs a reader select signal and a read gate signal to the preamp 286. The reader select signal configures a sensor select block 290 of the preamp 286 to connect and activate the respective sensors in accordance with the selected mode. The read gate signal is an enable signal to enable the reading of data using the sensors as respective data and servo sectors pass adjacent the sensors.

Differential pairs of conductors RDX/Y 1 and RDX/Y 2 route the respective outputs of the first and second read sensors 282, 284 to the channel SOC 280, which processes the signals based on the selected mode.

Figure 10:
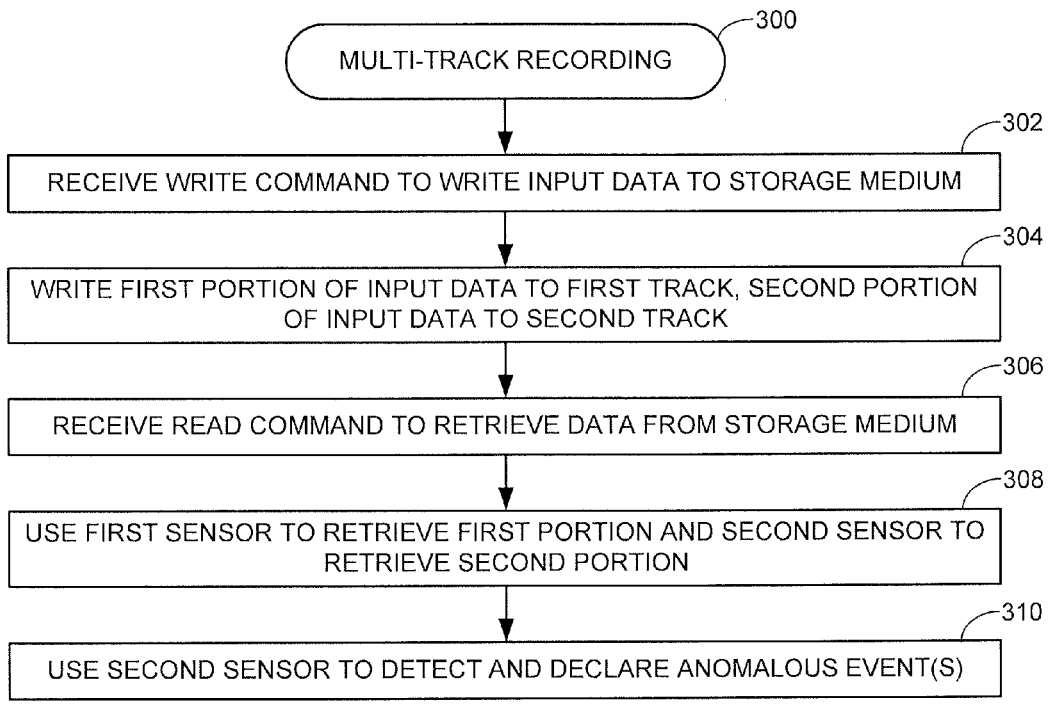
FIGS. 10 and 11 are respective flow charts for dual and single sensor operations in accordance with various embodiments.

FIG. 10 provides a multi-track recording routine 300 in accordance with the foregoing discussion. The routine 300 generally describes write and read operations in a two dimensional magnetic recording (TDMR) environment.

At step 302, a write command is received by a system (such as the device 100 of FIG. 1) to write input write data to a storage medium (such as the medium 102 in FIG. 1).

At step 304, suitable processing is applied to the input data such as run length limiting (RLL) encoding, error detection and correction (EDC) encoding, encryption, etc. Thereafter, a first portion of the processed input data is written to a first track on a recording surface, and a second portion of the processed input data is written to a second track on the recording surface. The data may be written using subsequent passes of a write transducer, or multiple write transducers can be used to concurrently write the first and second portions.

A read command is subsequently received by the system at step 306. The read command is serviced at step 308 by using a first sensor to retrieve the first portion and a second sensor to retrieve the second portion. The first sensor has an optimized reader response such as the first sensor 184 in FIG. 3, and the second sensor has a degraded reader response with finite TCR such as the second sensor 186 in FIG. 3. Additionally, the second sensor is used during the read operation to detect anomalous events, as shown by step 310.

Figure 11:
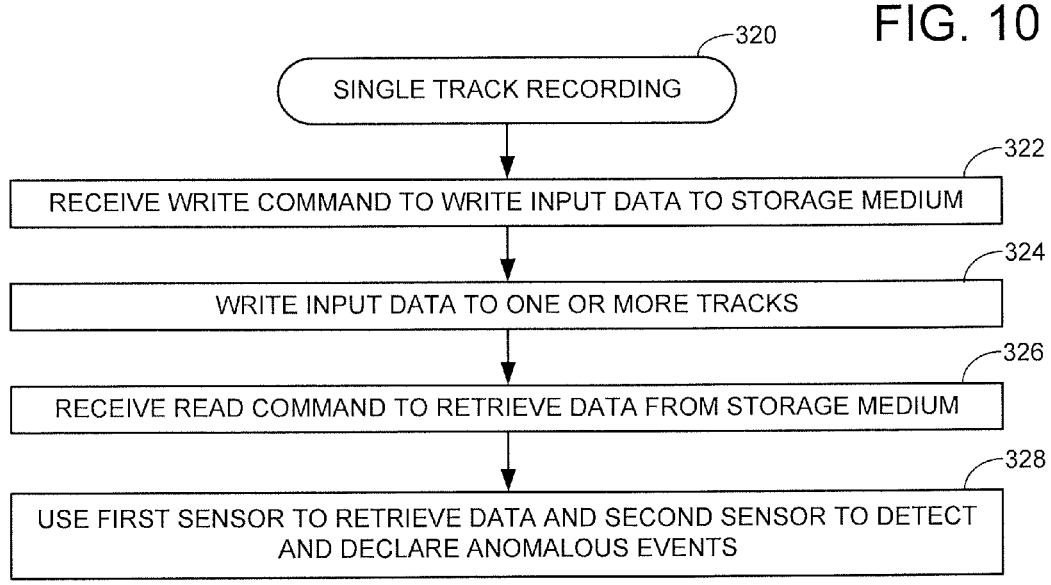

FIG. 11 shows a single track recording routine 320 in accordance with the foregoing discussion. The routine 320 generally describes write and read operations in a multi-sensor read (MSR) environment. It will be appreciated that both routines 300, 320 may be carried out at different times by the same reader section upon different portions of a recording medium.

A write command is received at step 322 to write certain input data to the storage medium. Suitable processing of the input data is carried out and the processed data are written to one or more tracks, step 324. A read command is subsequently received at step 326 to read the previously stored input data. The read command is serviced at step 328 by using the optimized first sensor to retrieve the data and the degraded second sensor to detect anomalous events.

In both routines, the detection of an anomalous event results in appropriate corrective actions as required, including read retries, marking of the locations of defects, adjustments to fly height of the transducer, etc.

It will now be appreciated that the various embodiments disclosed herein can present a number of features to a multi-sensor environment. The use of two (or more) different read sensors having different readback characteristics can allow the degraded sensor to recover data and detect anomalous events. Both TDMR and SMR techniques can be utilized.

The various structural configurations of the sensors, shields, and electrical bond pads of the reader sections described in the present disclosure allows for two dimensional magnetic reading or single track reading as required, including at different times using the same media. The reader sections are adapted for any number of different environments including shingled (partially overlapping) tracks. Different tracks can be written with different encoding schemes (RLL, EDC, etc.) to account for the different readback responses of the respective sensors. While the embodiments have been directed to magnetic sensing, it will be appreciated that the disclosed subject matter can readily be utilized in any number of other applications.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a data transducing head having a first read sensor optimized for reading data and a second read sensor optimized to detect thermal asperity (TA) events, the first and second read sensors electrically connected in series between opposing first and second electrically conductive connections and electrically connected in parallel to an intermediate third electrically conductive connection, the apparatus further comprising a read circuit that senses a first readback signal using the first and third connections and a second readback signal using the second and third connections.

2. The apparatus of claim 1, wherein the first read sensor comprises a non-magnetic barrier layer of a first material contactingly disposed between opposing magnetic layers, and the second read sensor comprises a non-magnetic barrier layer of a different second material contactingly disposed between opposing magnetic layers and formed of a different second material.

3. The apparatus of claim 2, wherein the first material is magnesium oxide (MgO) and the second material is titanium (Ti) or titanium oxide (TiO).

4. The apparatus of claim 1, wherein the first, second and third electrically conductive connections are bond pads operably coupled to the read circuit.

5. The apparatus of claim 1, wherein the first and second read sensors are further connected in series between a top shield and a bottom shield, an intermediate shield is disposed in series between the first and second read sensors, the first connection is connected to the top shield, the second connection is connected to the bottom shield, and the third connection is connected to the intermediate shield.

6. The apparatus of claim 1, wherein the read circuit passes a read bias current through the first and second sensors between the first connection and the third connection during the sensing of the first readback signal from the first read sensor and the sensing of the second readback signal from the second sensor.

7. The apparatus of claim 1, further comprising a control circuit connected to the transducing head configured to concurrently transduce readback data from first and second tracks using the first and second read sensors during a two dimensional magnetic recording (TDMR) mode of operation, the control circuit further adapted to transduce a readback signal from a third track using the first read sensor while sensing at least one TA event using the second read sensor during a multi-sensor read (MSR) mode of operation.

8. The apparatus of claim 1, wherein the first read sensor is configured to have a first, higher signal to noise ratio (SNR) response and the second read sensor is configured to have a second, lower SNR response, where the second SNR response is at least 10 dB lower than the first SNR response.

9. The apparatus of claim 1, wherein the first read sensor has a relatively low thermal coefficient of resistance (TCR and the second read sensor has a relatively higher thermal coefficient of resistance (TCR).

10. The apparatus of claim 1, wherein each of the first and second read sensors has a tri-layer construction.

11. The apparatus of claim 1, wherein a selected one of the first or second read sensors has a GMR construction, and a remaining one of the first or second read sensors has a non-GMR construction.

12. An apparatus comprising first and second read sensors adapted to sense magnetic patterns on an adjacent recording surface, the first read sensor comprising a non-magnetic barrier layer contactingly disposed between opposing magnetic layers and formed of a first material to provide an optimized reader response, the second read sensor comprising a non-magnetic barrier layer contactingly disposed between opposing magnetic layers and formed of a different second material to provide a finite thermal coefficient of resistance (TCR) response, the first and second read sensors separated by an intervening conductive shield therebetween and electrically connected in series between a first bond pad and a second bond pad each in turn connected to a read circuit.

13. The apparatus of claim 12, wherein the first material is magnesium oxide (MgO) and the second material is titanium (Ti) or titanium oxide (TiO).

14. The apparatus of claim 12, further comprising a third bond pad connected to the intervening conductive shield, the third bond pad connected to the read circuit.

15. The apparatus of claim 14, wherein a first electrically conductive bond pad is connected to the top shield, a second electrically conductive bond pad is connected to the bottom shield, and a third electrically conductive bond pad is connected to the intermediate shield, wherein a read bias current is flowed between the first and third bond pads so as to successively pass through the first and second read sensors, wherein a first readback signal is sensed from the first read sensor using the first and third bond pads, and wherein a second readback signal is sensed from the second read sensor using the second and third bond pads.

16. The apparatus of claim 12, further comprising a control circuit connected to the first and second read sensors and configured to concurrently transduce readback data from first and second tracks using the first and second read sensors during a two dimensional magnetic recording (TDMR) mode of operation, the control circuit further adapted to transduce a readback signal from a third track using the first read sensor while sensing at least one thermal asperity (TA) event using the second read sensor during a multi-sensor read (MSR) mode of operation.

17. The apparatus of claim 12, wherein the first and second read sensors are arranged within a reader sensor in non-overlapping relation in a cross-track direction.

18. The apparatus of claim 12, wherein the first and second read sensors are arranged within a reader sensor in overlapping relation in a cross-track direction.

19. A two dimensional magnetic recording (TDMR) system comprising:
   a first read sensor having a first signal to noise ratio (SNR) response and a relatively lower sensitivity to thermal asperity (TA) events;
   a second read sensor electrically connected to the first read sensor having a second SNR response lower than the first SNR response and a relatively higher sensitivity to TA events; and
   a read circuit configured to pass a read bias current through the first and second read sensors from a first bond pad to a second bond pad, to sense a first readback signal from the first read sensor responsive to the read bias current using the first bond pad and a third bond pad electrically connected between the first and second read sensors, and to sense a second readback signal responsive to the read bias current from the second read sensor using the first bond pad and the third bond pad.

20. The TDMR system of claim 19, wherein the first read sensor comprises a tunnel barrier layer of magnesium oxide (MgO) and the second read sensor comprises a tunnel barrier layer of titanium (Ti) or titanium oxide (TiO).

21. An apparatus comprising a data transducing head having a first read sensor optimized for reading data and a second read sensor optimized to detect thermal asperity (TA) events, the first and second read sensors electrically connected in series between opposing first and second electrically conductive connections and electrically connected in parallel to an intermediate third electrically conductive connection, the first read sensor comprising a non-magnetic barrier layer of a first material contactingly disposed between opposing magnetic layers, the second read sensor comprising a non-magnetic barrier layer of a different second material contactingly disposed between opposing magnetic layers and formed of a different second material.

22. The apparatus of claim 21, wherein the first material is magnesium oxide (MgO) and the second material is titanium (Ti) or titanium oxide (TiO).

23. The apparatus of claim 21, further comprising a read circuit configured to pass a read bias current through the first and second read sensors from a first bond pad to a second bond pad, to sense a first readback signal from the first read sensor responsive to the read bias current using the first bond pad and a third bond pad electrically connected between the first and second read sensors, and to sense a second readback signal responsive to the read bias current from the second read sensor using the first bond pad and the third bond pad.

* * * * *